K. A. SIMMON.
CONTROL APPARATUS.
APPLICATION FILED APR. 9, 1919.
1,363,679.
Patented Dec. 28, 1920.
2 SHEETS—SHEET 1.
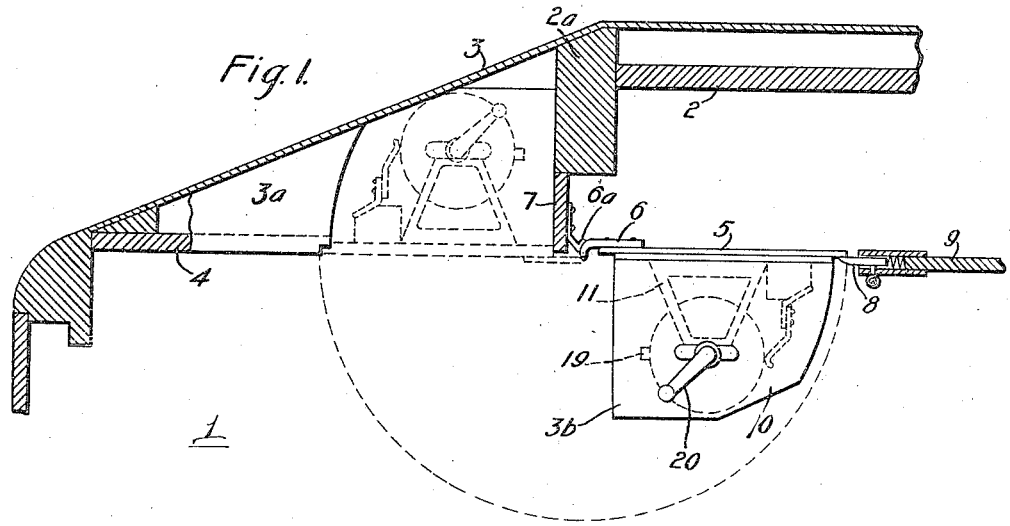
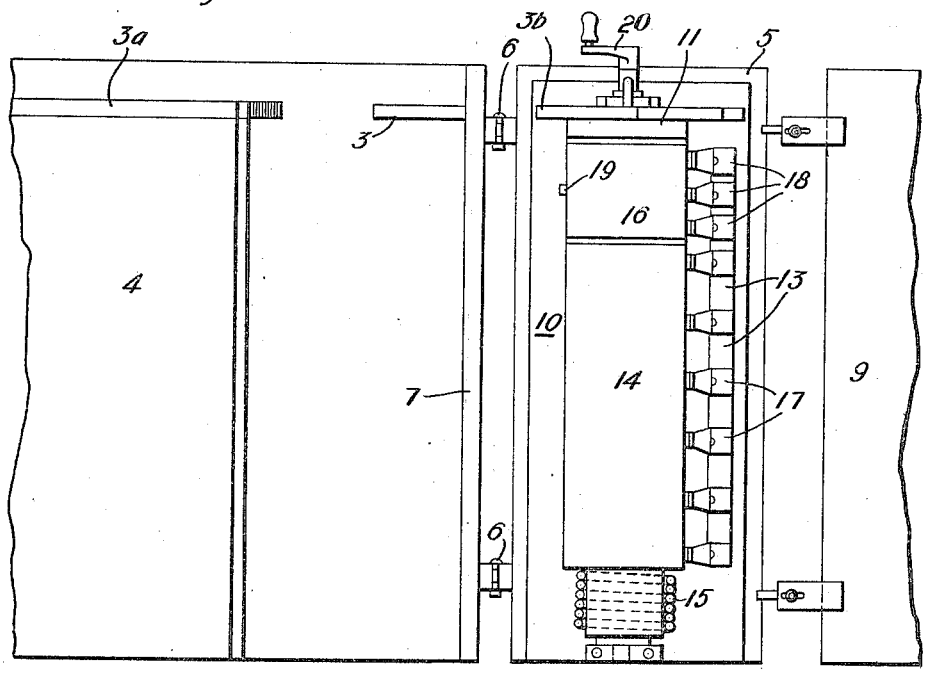
WITNESSES:
H. T. Shelhamer
W. R. Coley
INVENTOR
Karl A. Simmon
BY
Wesley G. Carr
ATTORNEY K. A. SIMMON.
CONTROL APPARATUS.
APPLICATION FILED APR. 9, 1919.
1,363,679.
Patented Dec. 28, 1920.
2 SHEETS—SHEET 2.
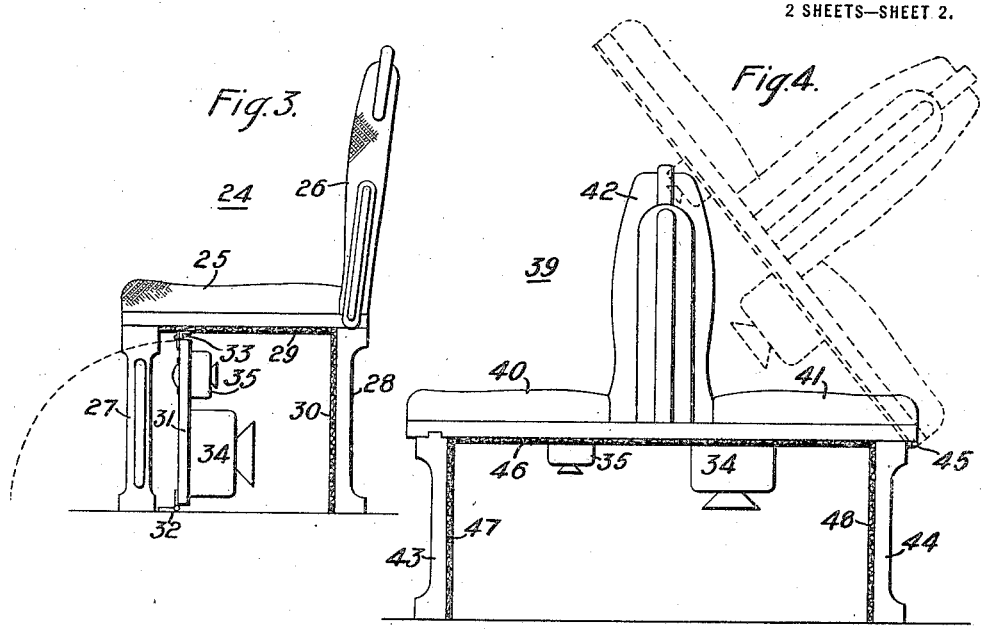
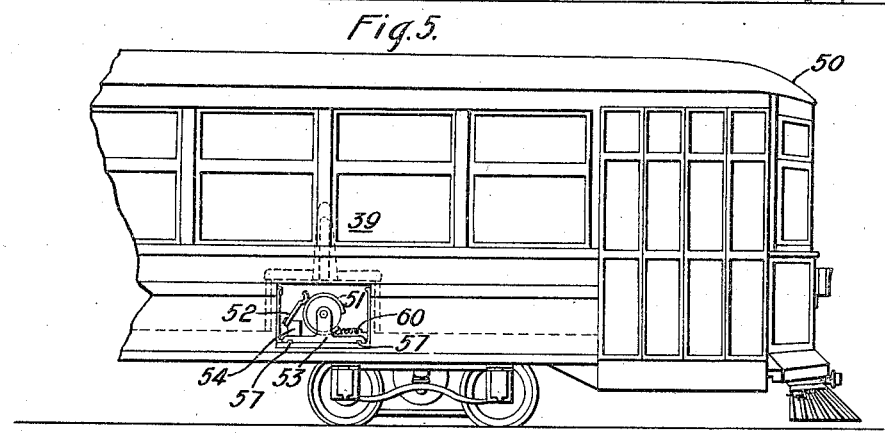
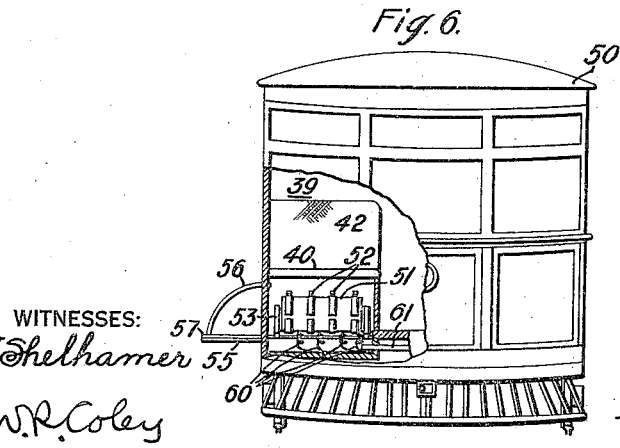
WITNESSES:
H. T. Shelhamer
W. R. Coley
INVENTOR
Karl A. Simmon
BY
Wesley G. Carr
ATTORNEY

UNITED STATES PATENT OFFICE.

KARL A. SIMMON, OF EDGEWOOD PARK, PENNSYLVANIA, ASSIGNOR TO WESTINGHOUSE ELECTRIC & MANUFACTURING COMPANY, A CORPORATION OF PENNSYLVANIA.

CONTROL APPARATUS.

1,363,679.

Specification of Letters Patent. Patented Dec. 28, 1920.

Application filed April 9, 1919. Serial No. 288,853.

*To all whom it may concern:*

Be it known that I, KARL A. SIMMON, a citizen of the United States, and a resident of Edgewood Park, in the county of Allegheny and State of Pennsylvania, have invented a new and useful Improvement in Control Apparatus, of which the following is a specification.

My invention relates to control apparatus for electrically-driven vehicles and particularly to the novel mounting or location thereof in various portions of the vehicle body or equipment.

It is the object of my invention to provide an arrangement of the above indicated character, whereby empty or partially unoccupied spaces in present-day vehicles, such as the spaces under car seats or between inner and outer walls of the frame-work, may be employed for housing various control apparatus to correspondingly reduce the space and weight factors of vehicles, which reductions are particularly desirable under the modern practice of eliminating all unnecessary vehicle bulk and weight, for the many well-known advantages that accrue therefrom.

More specifically stated, it is an object of my invention to so locate the various control apparatus in compartments that are formed by otherwise employed portions of the vehicle, such as the car seats, that one of the compartment walls may be restrictedly moved, as by means of a hinged support, to permit ready accessibility of the uncovered apparatus for purposes of inspection or repair.

My invention may best be understood by reference to the accompanying drawings, wherein—

Figure 1 is a transverse sectional view of the front walls of a vehicle, surrounding the operating platform.

Fig. 2 is a view, in front elevation, of the structure that is shown in Fig. 1.

Fig. 3 and Fig. 4 are views, in end elevation, with parts removed, of vehicle seats that are employed in conjunction with the present invention.

Fig. 5 is a view, in side elevation, of a portion of a vehicle constructed in accordance with another modification of my invention.

Fig. 6 is an end view of the vehicle, with parts broken away, further showing the type of apparatus housing that is illustrated in Fig. 5.

Referring to Fig. 1 and Fig. 2 of the drawings, the structure here shown comprises a front section 1 of an electrically-driven vehicle which essentially comprises a front vertical wall 2; a corner post or beam $2^a$; and the familiar panel or outer side wall 3 that slopes backwardly toward the car body proper. An inner wall 4 extends from the side of the vehicle, in the general direction of the corner post $2^a$, and comprises the stationary member that is shown in plan and a movable member 5 that normally occupies the dotted-line position in alinement with the fixed wall 4. A fixed top cover or panel $3^a$ and a cover $3^b$ that is movable with the wall 5 serve to close the illustrated control compartment. The movable wall 5 may be hinged or otherwise pivotally supported by a plurality of hinge members 6, or the like, which are secured to the movable wall 5 and to a fixed longitudinally-extending wall 7 that is directly fastened to the corner post $2^a$. However, if desired, a suitable sliding cover may be employed.

The solid-line position of the movable wall 5 is the non-operating or inspection position, and the wall may be held in this location by means of suitable latch members 8, which are secured to another inner wall or panel 9 of the vehicle. By suitably locating the latch members 8 and providing the hinge members 6, or other parts, with stops or lugs, such as that shown at $6^a$, the movable wall 5 may be rigidly held in the desired inspection position. It will be appreciated that, by a suitable re-arrangement of parts, an interchange of the inspection and operating positions may be effected, if desired.

Upon the inner surface of the movable wall 5 in its dotted-line or operative position, control apparatus 10 is mounted, in this case comprising a master controller.

The movable wall 5 suitably dove-tails with the fixed vertical walls 4 and 7 in the operative position of the control apparatus, whereby a compartment closed on all sides, including the top, is provided for the master controller, which thus utilizes the illustrated portions of the car framework as covers. In this way, the weight and cost of the customarily employed cover members are obviated. It will be understood that the movable wall 5 may be secured to the fixed wall 4 in any suitable manner, either by means of latch members, such as those shown at 8, or by screws or other securing means.

The master controller 10 is shown as comprising an upper bracket or support 11 and a lower bracket or journal 12, which are both suitably mounted upon the movable wall 5 of the operating compartment. Also, a finger-block 13, upon which a plurality of sets of control fingers 17 and 18 are mounted, is secured to the wall 5. The master controller may further comprise a contact-carrying drum or cylinder 14, which may be mechanically actuated by means of a familiar operating handle 20 that projects above the movable vertical wall 5 to permit convenient movement by the train operator. If desired, the lower portion of the drum 14 may be provided with a spiral spring 15, whereby the controller is automatically returned to the "off" or disconnected position, when the handle 20 is released, by accident or otherwise.

In addition, to save space, or to use the allowable space to the best advantage, the customary reversing drum 16 may be loosely mounted upon the operating shaft for the controller drum 14. A suitable number of control fingers 17 are provided for coöperating with the master-controller drum proper 14, while the usual three control fingers, designated as 18, are employed in conjunction with the master-reverser drum 16. For the purpose of actuating the reverser drum 16 to any of its positions, a stud or boss 19 may be provided upon the surface of the drum, whereby an operating handle or bar may be employed, being inserted either downwardly through the open top of the control compartment or horizontally through a suitable slot in the movable wall 5, as will be understood.

The operation of the modification of my invention that has just been described will be evident from the solid-line and dotted-line positions of the movable wall 5 and the corresponding positions of the associated control apparatus 10. Under operative conditions, the wall 5 occupies its dotted-line position to suitably house the master controller 10 in a compartment that is formed by the illustrated portions of the car framing, the compartment being closed on all sides except the top, as previously mentioned. However, when it is desirable to inspect or repair the controller, the movable wall 5 is swung around to its solid-line position, as indicated by the dotted-line circle, whereupon the uncovered apparatus is readily accessible for the desired purpose. It will be understood, without illustration, that the control leads or wires may be readily taken care of in any convenient manner, as by the use of a coupler for detaching the control fingers from the bundle of control conductors when it is necessary to swing the apparatus into inspection position, or, if desired, the wires may be made of sufficient length to permit the necessary movement of the apparatus, such wires being normally coiled within the operating control compartment.

Referring to Fig. 3, the apparatus shown comprises a reversible car seat 24, of a familiar form, having the usual seat proper 25 and the support or back 26, together with supporting legs or posts 27 and 28.

The control compartment under the seat is preferably lined, on at least two sides, with asbestos-protected steel plates 29 and 30, or the like, as is customary in the construction of unit-switch control groups at present. A panel or mounting board 31 is hinged to the car floor, as indicated at 32, and is held in the illustrated position by means of a latch or lock 33 that is fastened to the underside of the vehicle seat. Upon the panel 31 are mounted a plurality of unit switches or contactors 34 and 35, or other control apparatus for either the main or the auxiliary circuits of the vehicle. It will be understood that the inside wall of the vehicle, against which the seat 24 abuts, may be employed as one end cover for the control compartment, while a suitable permanent steel cover or the like may be placed at the other or aisle end.

For purposes of inspection or repair, the latch or lock 33 may be operated to permit the panel 31 to swing outwardly upon the car floor, as indicated by the dotted circle, whereby the control apparatus is readily accessible for the desired purpose.

Another form of my invention is shown in Fig. 4, which illustrates another familiar form of car seat 39 having seat members proper 40 and 41 and a common intermediate upright back or support 42. Supports or legs 43 and 44 are provided near the front ends of the seat members which, as a whole, are hinged or otherwise pivotively supported at one extremity, as indicated at 45. The control compartment beneath the seat is again lined with suitable asbestos-protected plates 46, 47 and 48, or the like, and suitable control apparatus, here indicated by the switching devices 34 and 35, is secured to the underside of the hinged seat member.

For purposes of inspection and repair, the seat member is swung upwardly around the pivotal point 45, as indicated by the dotted figure, to permit the desired ready accessibility of the control apparatus.

It will be appreciated that, if desired, a main reverser drum, a line switch or even a "K" controller may be housed beneath the seats illustrated in Fig. 3 and Fig. 4, to take the greatest advantage possible of all available space and to remove such apparatus from beneath the car floor, thus permitting the construction of a relatively low-floor car, or better wiring and repair facilities for the necessary apparatus under the car, such as the propelling motors.

Referring to Fig. 5 and Fig. 6, a vehicle 50 contains a seat 39 of the type shown in Fig. 4, and a pivotally mounted door or panel 55 in the side of the vehicle is located opposite the end of the control compartment under the seat.

In the present case, the illustrated control apparatus is of the drum-controller type comprising a drum or cylinder 51; a plurality of control fingers 52; and a one-piece standard or bracket 53 upon which the customary finger block 54 is mounted. Normally, the movable door or panel 55 occupies a closed position, wherein it may be latched or locked in any convenient manner, and the appearance and regular contour of the vehicle are not changed in any way by reason of employing this door member. However, when it is desired to inspect or repair the illustrated control apparatus, the door is unlatched or unlocked and swung open to the illustrated horizontal position, wherein it may be held by means of a curved guide 56 or by a chain or other suitable means. To facilitate such inspection or repair, the inner wall of the door 55 is provided with a pair of slides or runners 57 along which the controller bracket 53 may horizontally slide when the door 55 occupies the illustrated position, wherein the movable door or wall 55 acts as a shelf to receive the control apparatus external to the car body, thus greatly facilitating the necessary inspection or repairs.

To permit the desired movement of the controller, suitable flexible leads 60 for the control fingers 52 may be coiled within the control compartment under the car seat, such leads being housed in the customary conduit 61 after leaving the control compartment.

I do not wish to be restricted to the specific structural details or arrangement of parts herein set forth, as various modifications thereof may be made without departing from the spirit and scope of my invention. I desire, therefore, that only such limitations shall be imposed thereupon as are indicated in the appended claims.

I claim as my invention:

1. In an electrically-driven vehicle, the combination with control apparatus normally located in a compartment formed by otherwise employed portions of the vehicle, of means for mounting said apparatus on a compartment wall to permit restricted movement of said wall out of said compartment.

2. In an electric vehicle, the combination with controlling apparatus normally located to use otherwise employed portions of the vehicle as covers, of means for actuating one of said portions carrying the apparatus to permit ready accessibility of the uncovered apparatus.

3. In an electric vehicle, the combination with control apparatus normally located to use portions of the vehicle frame-work as covers during operation, of means for restrictedly moving one of said portions carrying said apparatus to permit ready accessibility of the uncovered apparatus.

4. In an electric vehicle, the combination with a master controller mounted upon one wall of a compartment formed by the vehicle front frame-work, of means for pivotally supporting said mounting wall to permit swinging the uncovered apparatus into an open and accessible position.

5. In an electric vehicle, the combination with control apparatus mounted upon one wall of a compartment formed by the vehicle-front frame-work, of means for restrictedly moving said wall to place the uncovered apparatus in an accessible position.

6. In an electric vehicle, a control drum mounted upon the rear wall of a compartment formed by the vehicle-front frame-work, said wall being movably mounted to permit restricted movement of the controller out of said compartment.

7. In an electric vehicle, a control drum mounted upon one wall of a compartment formed by the vehicle-front frame-work, said wall being hingedly supported in a vertical direction to permit swinging the uncovered apparatus into an accessible position, and means for automatically latching the wall in such position.

In testimony whereof, I have hereunto subscribed my name this 31st day of March 1919.

KARL A. SIMMON.